United States Patent [19]
Heise

[11] Patent Number: 5,295,011
[45] Date of Patent: Mar. 15, 1994

[54] OPTICAL DUPLEXER FOR BIDIRECTIONAL OPTICAL INFORMATION TRANSMISSION

[75] Inventor: Gerhard Heise, Munich, Fed. Rep. of Germany

[73] Assignee: Siemens Aktiengesellschaft, Munich

[21] Appl. No.: 56,824

[22] Filed: May 3, 1993

Related U.S. Application Data

[63] Continuation of Ser. No. 717,516, Jun. 19, 1991, abandoned.

[30] Foreign Application Priority Data

Jun. 25, 1990 [DE] Fed. Rep. of Germany ....... 4020214

[51] Int. Cl.$^5$ ...................... H04B 10/24; H04B 10/00
[52] U.S. Cl. .................................... 359/114; 359/116; 359/152; 359/113; 385/24; 385/41; 385/47
[58] Field of Search ............... 359/113, 114, 116, 152; 385/14, 24, 41, 47

[56] References Cited

U.S. PATENT DOCUMENTS

| | | | |
|---|---|---|---|
| 4,223,977 | 9/1980 | Papuchon et al. | 385/41 |
| 4,656,636 | 4/1987 | Amann et al. | 372/50 |
| 4,674,827 | 6/1987 | Izutsu et al. | 385/2 |
| 4,865,408 | 9/1989 | Korotky | 385/41 |
| 4,909,584 | 3/1990 | Imoto et al. | 359/124 |
| 4,911,512 | 3/1990 | Yamamoto et al. | 385/33 |
| 4,979,790 | 12/1990 | Walker | 385/14 |
| 5,031,188 | 7/1991 | Koch et al. | 359/124 |
| 5,050,952 | 9/1991 | Fussgager | 359/127 |

OTHER PUBLICATIONS

GaInAsP/InP Zero-Gap Directional Couplers As Compact Optical WDM Filters, Electronics Ltrs. Aug. 17, 1989 vol. 25, No. 17 pp. 1180-1181.

*Primary Examiner*—Richard E. Chilcot, Jr.
*Assistant Examiner*—Rafael Bacares
*Attorney, Agent, or Firm*—Hill, Steadman & Simpson

[57] ABSTRACT

Optical duplexer for bidirectional optical information transmission. In the optical duplexer for bidirectional information transmission, a phase difference is produced between two optical waves reflected back to the duplexer on different optical paths for reducing a near-end crosstalk while avoiding the generation of a difference in path length between the two paths. Provided is a device for controlling the phase of an optical wave reflected back into the duplexer on one of the two paths or provided are two paths having a difference in optical wavelength produced by a difference in refractive index. In particular, it is beneficial to set or fix the phase difference between the optical waves reflected back into the duplexer on the two paths to $\pi/2$. The optical coupler is advantageously utilized in bidirectional information transmission.

29 Claims, 2 Drawing Sheets

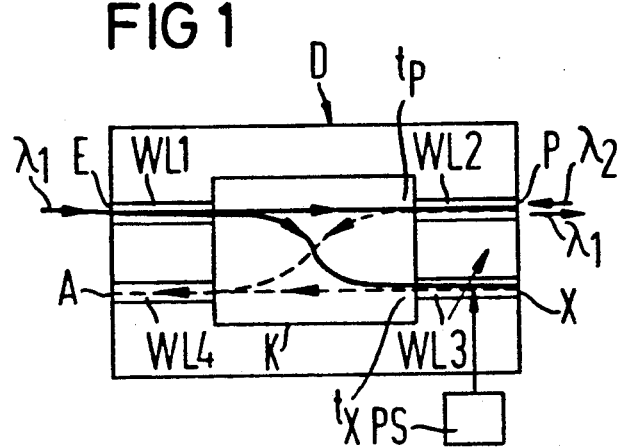
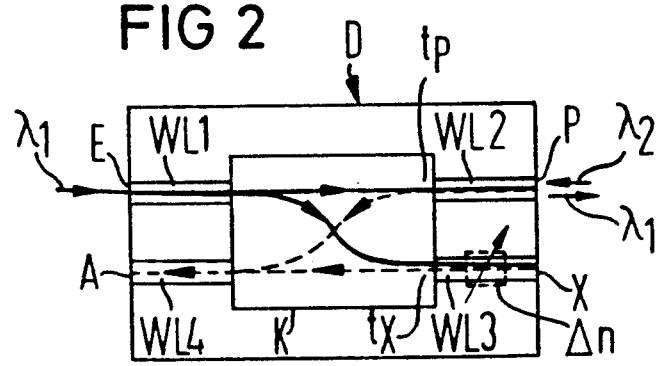
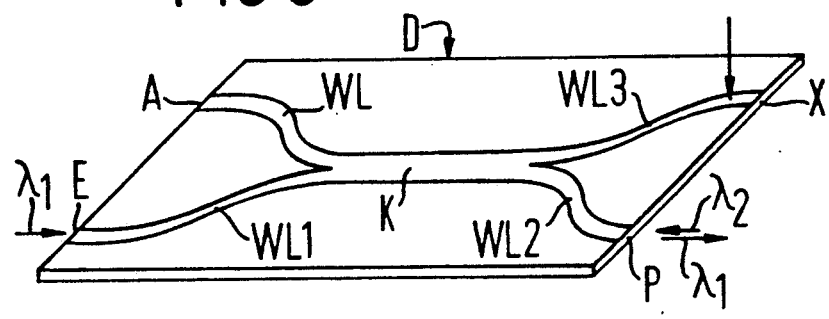

OPTICAL DUPLEXER FOR BIDIRECTIONAL OPTICAL INFORMATION TRANSMISSION

This is a continuation, of application Ser. No. 717,516, filed Jun. 19, 1991 now abandoned.

BACKGROUND OF THE INVENTION

The present invention is directed to an optical duplexer for bidirectional optical information transmission and in particular to an optical duplexer having a wavelength-selective optical coupler having four ports. A first port is provided for input of a first optical wavelength and a second port is provided for input of a second optical wavelength. The coupler is fashioned such that an optical wave of the first wavelength input through the first port at a first side of the coupler is conducted partially to the second port at a second side of the coupler and partially to a third port also at this second side. The optical wave of the second wavelength input through the second port is entirely or partially conducted to a fourth port at the first side of the coupler. An optical wave of the first wavelength returning to the coupler from the second port is supplied to the coupler on a first path and an optical wave of the first wavelength returning to the coupler from the third port is supplied to the coupler on a second path. The optical waves of the first wavelength returning to the coupler on the two paths are brought to interference in the coupler and the combined optical waves of the first wavelength are entirely or partially supplied to the fourth port.

A disadvantage of prior art duplexers of this type is that discontinuities in refractive index are usually present at the second and third port, a part of the optical waves having the first wavelength supplied to these two ports from the first port via the coupler being reflected back from these discontinuities by a refractive index of the coupler. In the coupler, the two waves reflected back are brought into interference and are supplied in this form as undesired light to the fourth port, producing undesired near-end crosstalk. The optical waves of the first wavelength returning from the second and third ports usually travel back to the coupler over two different optical paths that can have the same or different optical path lengths.

The near-end crosstalk produced by the afore-mentioned undesired light is dependent on a phase difference between the optical waves of the first wavelength returned over the two paths. It is known in the prior art to minimize this crosstalk by setting this phase difference to a predetermined value, whereby it was also known to generate this predetermined value on the basis of a correspondingly selected difference in path lengths for the two optical paths. This passive phase matching requires technologies that must be governed with extreme precision for producing the duplexer that is preferably manufactured in integrated-optical form. In such an integrated-optical duplexer, the value of the difference in path length requires that the optical path length be governed to fractions of the wavelength, resulting in geometrical tolerances of approximately 20 nm.

SUMMARY OF THE INVENTION

It is an object of the present invention to provide a duplexer, wherein an adjustment of the phase difference between the optical waves of the first wavelength guided in the two paths can be generated with a value required for reducing the near-end crosstalk while avoiding the creation of a difference in path length between the two optical paths.

This object is achieved by providing in the duplexer of the type initially cited a means for controlling the phase of the optical wave of the first wavelength returning to the coupler on one of the two paths to a predetermined value in a predetermined value range.

An active phase setting is thereby realized in the duplexer of the present invention. For passive phase matching the two optical paths have a prescribable difference in optical path length produced by a permanent difference in refractive index. These inventive solutions can be realized with optical couplers that are based on two beam interference or two mode interference.

Preferred and advantageous developments of the active and passive duplexers described above are as follows. In an active duplexer the means for controlling the phase can set a refractive index in one of the two optical paths to a value by thermal influencing required for achieving the predetermined value of the phase. Also, the means for controlling the phase can set a refractive index of one of the two optical paths to a value by electrooptical influencing required for achieving the prescribable value of the phase. Furthermore, the means for controlling the phase can set a refractive index of one of the two optical paths to a value required for achieving the prescribable value of the phase by charge carrier injection into a semiconductor material.

For a passive duplexer the permanent difference in refractive index can be generated by a geometrically different shaping of an optical waveguide of one of the two optical paths in comparison to an optical waveguide of the other optical path. Also, the permanent difference in refractive index can be generated by a doping of one of the two optical paths, one path differing from the other path on the basis of the doping.

Furthermore, for both the active and passive duplexers either the second port or the third port of the coupler can discharge into an optical sink. Also, the phase of the optical wave of the first wavelength returning to the coupler on one of the two optical paths can be set to or fixed at a predetermined value that differs by $\pi/2$ from the phase of the optical wave of the first wavelength returning to the coupler on the other of the two paths.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a plan view of a duplexer of the present invention having active phase influencing;

FIG. 2 is a plan view of a duplexer of the present invention having passive phase matching;

FIG. 3 is a perspective view of an integrated-optical embodiment of the FIG. 1 duplexer;

DESCRIPTION OF THE PREFERRED EMBODIMENT

Depicted in FIGS. 1 and 2, is a duplexer D having wavelength-selective coupler K, a first port E, a second port P, a third port X and a fourth port A. Each port E, P, X and A is defined by the end of an associated waveguide WL1, WL2, WL3 and WL4, respectively, leading to the coupler K.

For example the duplexer of FIGS. 1 and 2 is operated such that an optical wave having a first wavelength $\lambda_1$ that is emitted by a laser and that carries information is coupled in via the first port E and is transmitted via the coupler K to the second port P from which this optical wave is transmitted in an optical fiber to, for example, a remote duplexer of the same or complimentary type. From the fiber, an optical wave having the second wavelength $\lambda_2$ and carrying information is supplied to the second port P, this optical wave being conducted via the coupler K to the fourth port A that can be connected to an optical receiver.

Figure 4:
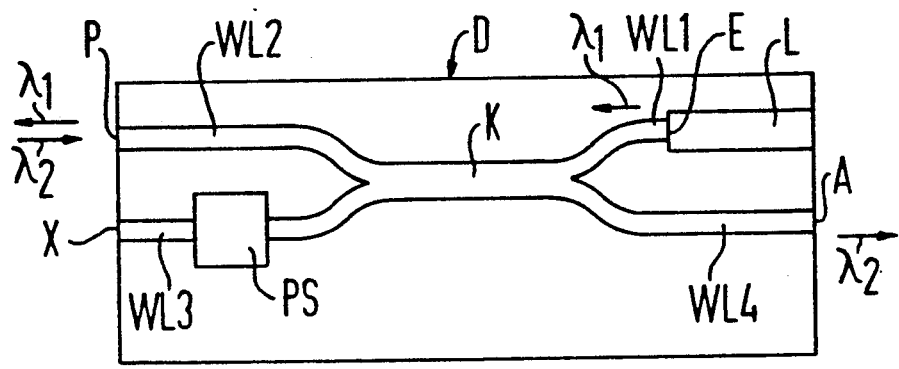
FIG. 4 is an integrated-optical realization of a duplexer according to FIG. 1 or 2, wherein a laser diode is integrated on the same substrate as transmitter for generating the first wavelength $\lambda_1$.
Figure 5:
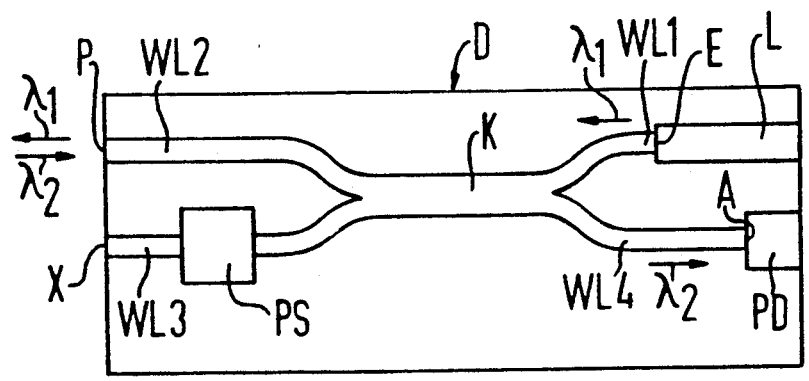
FIG. 5 is an integrated-optical realization of a duplexer according to FIGS. 1 or 2, wherein a laser diode as transmitter for the first wavelength $\lambda_1$ and a photodiode as receiver for the second wavelength $\lambda_2$ are integrated on the same substrate.

The transmitter for generating the first wavelength $\lambda_1$ and the receiver for the reception of the second wavelength $\lambda_2$ can be integrated on a common substrate together with the duplexer. FIG. 4 shows such a realization wherein a laser L, for example, a laser diode, is integrated on the common substrate S as transmitter for the first wavelength $\lambda_1$. FIG. 5 shows such a realization wherein a laser L as transmitter for the first wavelength $\lambda_1$ and a photodiode PD as receiver for the second wavelength $\lambda_2$ are integrated on the common substrate S. The execution of the laser L having integrated waveguide WL1 can occur in both instances according to, for example, EP 0 178 497 B1 (U.S. Pat. No. 4,656,636 hereby incorporated by reference). In the realization of FIG. 5, the crosstalk from the laser L onto the photodiode caused by reflection is advantageously reduced by a suitable setting of the phase difference between the light of the first wavelength $\lambda_1$ reflected at the second port P and the light of the first wavelength $\lambda_1$ reflected at the third port X. The third port X can discharge into an optical sink that is integrated on the substrate or that can be connected to the third port X in some other manner. In the latter case, the waveguide WL3 ends at an edge of the substrate at which the waveguide WL2 that is coupled to the fiber also ends.

Usually, the optical wave having the first wavelength $\lambda_1$ that is coupled in through the first port E is also supplied in part to the third port X. In general, a reflection coefficient is present at the second port P and at the third port X, this reflection coefficient causing a reflection of a part of the optical wave having the first wavelength $\lambda_1$ supplied to the port P or X back to the coupler K on the waveguide WL2 or, respectively, on the waveguide WL3. In the coupler K, these two back-reflected parts are brought into interference and are supplied combined to the fourth port A by the waveguide WL4.

The paths whereon the optical wave having the wavelength $\lambda_1$ coupled in through the first port E proceeds to the second port P or, respectively, to the third port X, are shown as solid lines that have an arrowhead pointed toward the right in FIGS. 1 and 2. The paths whereon the light reflected back from the second port P or, respectively, from the third port X to the coupler K proceeds to the fourth port A, are shown as broken lines that are provided with arrowheads directed toward the left in FIGS. 1 and 2. In particular, the light reflected from the second port P proceeds to the coupler K on a first optical path established by the waveguide WL2, whereas the light reflected at the third port X proceeds back to the coupler K on a second optical path established by the waveguide WL3.

In the arrangement of FIG. 1, a means PS for controlling the phase of the optical wave of the one wavelength $\lambda_1$ returning to the coupler on one of the two optical paths WL2 and WL3, for example on the optical path WL3, to a predetermined value from a predetermined value range is inventively provided.

In the duplexer of FIG. 2, the two optical paths WL2 and WL3 inventively comprise a prescribable difference in optical path length generated by a permanent difference $\Delta n$ in refractive index. In the example of FIG. 2, this difference $\Delta n$ in refractive index is realized at the waveguide WL3. The permanent difference $\Delta n$ in refractive index can be produced by a geometrically different shaping of one of the optical waveguide WL3 or WL2 of one of the two optical paths in comparison to one of the optical waveguide WL2 or, respectively, WL3 of the other optical path. For example, given a ridge waveguide buried in InP having a waveguiding layer of InGaAsP with $\lambda_{gap} = 1.05$ $\mu$m, a ridge height of 0.5 $\mu$m and a width of the ridge of 1 $\mu$m, a variation in the effective refractive index of 0.004 can be achieved in that the thickness of the quaternary layer next to the ridge is reduced from 300 nm to 200 nm. Smaller changes in refractive index can be correspondingly achieved by shallower etching depths.

The permanent difference $\Delta n$ in refractive index can also be produced by a doping of one of the two optical paths, the one path differing from the other path on the basis of said doping.

The integrated-optical exemplary embodiment of the FIG. 1 duplexer shown in FIG. 3 is a duplexer having thermic phase matching, wherein the coupler K is composed of a BOA directional coupler described in Electronic Letters 25 (1989) pages 1180-1181 (hereby incorporated by reference). In this duplexer, the near-end crosstalk is reduced, for example, by the inventive, thermal influencing of the refractive index. As in the duplexer of FIG. 1, the line fiber in the duplexer of FIG. 3 should be attached to the second port P. Incoming light of the second wavelength $\lambda_2$ should be conducted to the fourth port A and the light of the first wavelength $\lambda_1$ to be transmitted onto the link is coupled in at the first port E. The near-end crosstalk indicates how much light proceeds from the first port E to the fourth port A. For phase influencing, the light of an argon ion laser is focused onto the waveguide WL2 or onto the waveguide WL3. The refractive index changes due to the local heating. As a result of the active trimming, the near-end crosstalk is reduced by 90% in this experiment. The minimum near-end crosstalk obtainable in this manner is no longer established by guided light but rather by scattered light in the waveguide layer.

The heating of the associated waveguide can occur, for example, via a vapor-deposited interconnect or via a cointegrated resistor. It follows for an InGaAsP/InP waveguide having $\lambda_{gap}$ and a measured temperature coefficient of the refractive index of $2.2 \times 10^{-4}$/K, that a temperature difference of approximately 18° K. between the waveguide WL2 and the waveguide WL3 is required for the required phase shift over a distance of L = 100 μm, given λ=1.5 μm. Given suitably dimensioned components, an approximately 70 μm spacing between the waveguides WL2 and WL3 and a heated area of 100×1μm, a heating capacity of approximately 100 mW is required for this purpose.

The means PS of the duplexer of FIG. 1 can also be a phase shifter based on charge carrier injection that is integrated in one of the two waveguides WL2 or WL3. The dependency of the refractive index of InP on the electron density N amounts to $dn/dN = -10^{-20} cm^{-3}$. Given a length of the phase shifter of 100 μm, an additional carrier density of $4 \times 10^{17} cm^{-3}$ is therefore required. This can be simply injected with a PIN ridge waveguide structure. The near-end crosstalk can be compensated to approximately $3 \times 10^{-4}$ of a maximum value with such a phase shifter.

Phase modulators have been realized in various materials, for example in glass, in $LiNbO_3$ or III/V semiconductors. Electrooptical phase influencing has been realized, for example, in $LiNbO_3$ and phase influencing on the basis of charge carrier injection has been realized on InGaAsP/InP. Given a length of the phase modulator of 100 μm, a maximum change in refractive index of $\Delta n = 0.004$ is required.

In all duplexers wherein essentially the same reflectivity for the first wavelength $\lambda_1$ is present at the second port P and at the third port X, the near-end crosstalk produced by reflection can advantageously completely compensate for arbitrary reflectivity when the phase difference is set or fixed to a predetermined value of $\pi/2$. Regardless thereof, the reflectivity should be as low as possible in order to keep the insertion losses of the duplexer and the reaction of the reflection onto the first port E low.

In order to also enable a complete compensation of the near-end crosstalk in the worst case, a range of adjustment with a maximum of $\pi/2$ is required for the phase. What this means for a maximum wavelength $\lambda = 1.6$ μm is that the path length difference between the waveguide WL2 and the waveguide WL3 must be less than or equal to 0.4 μm. Consequently, given a length of the phase modulator of 100 μm or a distance of the waveguide WL2 or WL3 of 100 μm, a maximum change $\Delta n$ in refractive index of 0.004 is required.

When the third port X of a duplexer of the present invention discharges into an optical sink, then the near-end crosstalk is essentially dependent only on the reflectivity at the second port P. A channel separation of at least 45 dB as required for integrated-optical duplexers can be achieved with a duplexer of the present invention.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An optical duplexer for bidirectional optical information transmission, having a wavelength-selective optical coupler having first, second, third and fourth ports, the first port being provided for input of a first optical wavelength and the second port being provided for input of a second optical wavelength, said coupler being fashioned such that an optical wave of the first optical wavelength input through the first port is conducted partially to the second port and partially to the third port, such that an optical wave of the second optical wavelength input through the second port is at least partially conducted to the fourth port, such that each of said second and third ports have a reflection coefficient that respectively produces a first reflected optical wave of the first optical wavelength returning to the coupler from the second port and supplied to the coupler on a first path and a second reflected optical wave of the first optical wavelength returning to the coupler from the third port and supplied to the coupler on a second path, and such that the first and second reflected optical waves of the first optical wavelength returning to the coupler on the first and second paths, respectively, are brought to interference in the coupler and the combined first and second reflected optical waves of the first optical wavelength are at least parially supplied to the fourth port, comprising: means for controlling the phase of one of the first and second reflected optical waves of the first optical wavelength returning to the coupler on the respective path of the first and second paths to a predetermined value in a predetermined value range such that a resulting phase difference between the first and second reflected optical waves of the first optical wavelength has a value that reduces near-end crosstalk of the coupler to a predetermined level.

2. The duplexer according to claim 1, wherein the means for controlling the phase sets a refractive index in said respective path of the first and second paths to a value by thermal influencing required for achieving the predetermined value of the phase.

3. The duplexer according to claim 1, wherein the means for controlling the phase sets a refractive index in said respective path of the first and second paths to a value by electrooptical influencing required for achieving the predetermined value of the phase.

4. The duplexer according to claim 1, wherein the means for controlling the phase sets a refractive index in said respective path of the first and second paths to a value required for achieving the predetermined value of the phase by charge carrier injection into a semiconductor material.

5. An optical duplexer for bidirectional optical information transmission, having a wavelength-selective optical coupler having first, second, third and fourth ports, the first port being provided for input of a first optical wavelength and the second port being provided for input of a second optical wavelength, said coupler being fashioned such that an optical wave of the first optical wavelength input through the first port is conducted partially to the second port and partially to the third port, such that an optical wave of the second optical wavelength input through the second port is at least partially conducted to the fourth port, such that each of said second and third ports have a reflection coefficient that respectively produces a first reflected optical wave of the first optical wavelength returning to the coupler from the second port and supplied to the coupler on a first path and a second reflected optical wave of the first optical wavelength returning to the coupler from the third port and supplied to the coupler on a second path, and such that the first and second reflected optical waves of the first optical wavelength returning to the coupler on the first and second paths, respectively, are brought to interference in the coupler and the combined first and second reflected optical waves of the first optical wavelength are at least partially supplied to the fourth port, comprising: the first and second paths having a predetermined difference in optical path length produced by a permanent difference in refractive index between the first and second paths such that a resulting phase difference between the first and second reflected optical waves of the first optical wavelength has a value that reduces near-end crosstalk of the coupler to a predetermined level.

6. The duplexer according to claim 5, wherein the permanent difference in refractive index is generated by a geometrically different shaping of the respective path of the first and second paths in comparison to the respective path of the other path of the first and second paths.

7. The duplexer according to claim 5, wherein the permanent different in refractive index is generated by a doping of one path of the first and second paths, the one path of the first and second paths differing from the other path of the first and second paths on the basis of said doping.

8. The duplexer according to claim 5, wherein one of the second port and the third port of the coupler discharges into an optical sink.

9. The duplexer according to claim 5, wherein, in response to a control parameter, said means for controlling sets the phase of the reflected optical wave of the first wavelength returning to the coupler on one of the first and second paths to a predetermined value that differs by $\pi/2$ from the phase of the reflected optical wave of the first wavelength returning to the coupler on the other of the first and second paths.

10. The duplexer according to claim 1, wherein one of the second port and the third port of the coupler discharges into an optical sink.

11. The duplexer according to claim 1, wherein, in response to a control parameter, said means for controlling sets the phase of a reflected optical wave of the first optical wavelength returning to the coupler on one of the first and second paths to a predetermined value that differs by $\pi/2$ from the phase of a reflected optical wave of the first optical wavelength returning to the coupler on the other of the first and second paths.

12. An optical duplexer for bidirectional optical information transmission, comprising: a wavelength-selective optical coupler having first, second, third and fourth ports, a first optical wavelength being input on only said first port and a second optical wavelength being input on only said second port, said first optical wavelength being different than said second optical wavelength, said first optical wavelength being output on only said second port and said second optical wavelength being output on only said fourth port, said first and second optical wavelengths being input to said first and second ports, respectively, independent of one another; said coupler structured such that an optical wave of the first optical wavelength input through the first port is conducted partially to the second port and partially to the third port, an optical wave of the second optical wavelength input through the second port being at least partially conducted to the fourth port, each of said second and third ports having a reflection coefficient that respectively produces a first reflected optical wave of the first optical wavelength returning to the coupler from the second port and supplied to the coupler on a first path and a second reflected optical wave of the first optical wavelength returning to the coupler from the third port and supplied to the coupler on a second path, the first and second reflected optical waves of the first optical wavelength returning to the coupler on the first and second paths being brought to interference in the coupler and the combined first and second reflected optical waves of the first optical wavelength being at least partially supplied to the fourth port; and means for controlling the phase of one of the first and second reflected optical waves of the first optical wavelength returning to the coupler on the respective path of the first and second paths to a predetermined value in a predetermined value range such that a resulting phase difference between the first and second reflected optical waves of the first optical wavelength has a value that reduces near-end crosstalk of the coupler to a predetermined level.

13. The duplexer according to claim 12, wherein the means for controlling the phase sets a refractive index in said respective path of the first and second paths to a value by thermal influencing required for achieving the predetermined value of the phase.

14. The duplexer according to claim 12, wherein the means for controlling the phase sets a refractive index in said respective path of the first and second paths to a value by electrooptical influencing required for achieving the predetermined value of the phase.

15. The duplexer according to claim 12, wherein the means for controlling the phase sets a refractive index in said respective path of the first and second paths to a value required for achieving the predetermined value of the phase by charge carrier injection into a semiconductor material.

16. The duplexer according to claim 12, wherein said means for controlling comprises the first and second paths having a predetermined difference in optical path length produced by a permanent difference in refractive index between the first and second paths.

17. The duplexer according to claim 16, wherein the permanent difference in refractive index is generated by a geometrically different shaping of the respective path of the first and second paths in comparison to the respective path of the other path of the first and second paths.

18. The duplexer according to claim 16, wherein the permanent difference in refractive index is generated by a doping of one path of the first and second paths, the one path differing from the other path of the first and second paths on the basis of said doping.

19. The duplexer according to claim 12, wherein one of the second port and the third port of the coupler discharges into an optical sink.

20. The duplexer according to claim 12, wherein, in response to a control parameter, said means for controlling sets the phase of a reflected optical wave of the first optical wavelength returning to the coupler on one of the first and second optical paths to a predetermined value that differs by $\pi/2$ from the phase of a reflected optical wave of the first optical wavelength returning to the coupler on the other of the first and second paths.

21. The duplexer according to claim 1, wherein the duplexer is integrated on a substrate.

22. The duplexer according to claim 21, wherein an optical transmitter for generating the first optical wavelength that is coupled in through the first port is integrated on the substrate.

23. The duplexer according to claim 21, wherein an optical receiver for receiving the second optical wavelength supplied to the fourth port is integrated on the substrate.

24. The duplexer according to claim 5, wherein the duplexer is integrated on a substrate.

25. The duplexer according to claim 24, wherein an optical transmitter for generating the first optical wavelength that is coupled in through the first port is integrated on the substrate.

26. The duplexer according to claim 24, wherein an optical receiver for receiving the second optical wavelength supplied to the fourth port is integrated on the substrate.

27. The duplexer according to claim 12, wherein the duplexer is integrated on a substrate.

28. The duplexer according to claim 27, wherein an optical transmitter for generating the first optical wavelength that is coupled in through the first port is integrated on the substrate.

29. The duplexer according to claim 27, wherein an optical receiver for receiving the second optical wavelength supplied to the fourth port is integrated on the substrate.

* * * * *